United States Patent
Kim et al.

(10) Patent No.: US 8,303,447 B1
(45) Date of Patent: Nov. 6, 2012

(54) POWER TRANSMISSION SYSTEM OF HYBRID ELECTRIC VEHICLE

(75) Inventors: Baekyu Kim, Suwon-si (KR); Jang Mi Lee, Tongyeong-si (KR); Sungik Bae, Suwon-si (KR); Yeonho Kim, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/303,698

(22) Filed: Nov. 23, 2011

(51) Int. Cl.
*F16H 3/72* (2006.01)
*F16H 37/06* (2006.01)

(52) U.S. Cl. ............................................. 475/5; 475/284
(58) Field of Classification Search .................. 475/3, 5, 475/284, 296
See application file for complete search history.

(56) References Cited

U.S. PATENT DOCUMENTS

| 7,220,203 | B2 * | 5/2007 | Holmes et al. ..................... 475/5 |
| 2011/0070992 | A1 * | 3/2011 | Si .................................. 475/149 |

FOREIGN PATENT DOCUMENTS

| JP | 4007403 B1 | 9/2007 |
| KR | 10-2011-0006907 A | 1/2011 |
| KR | 10-2011-0062140 A | 6/2011 |

* cited by examiner

*Primary Examiner* — Justin Holmes
(74) *Attorney, Agent, or Firm* — Morgan, Lewis Bockius LLP

(57) ABSTRACT

A power transmission system includes an input shaft, a first planetary gear set having first, second, and third rotation elements, wherein the first rotation element is connected to a first motor/generator and the third rotation element is connected to the input shaft, a second planetary gear set having fourth, fifth, and sixth rotation elements, wherein the fourth rotation element is connected to the second rotation element and a second motor/generator, and the fifth rotation element engagable with the first rotation element, an output gear connected to the sixth rotation element, a first clutch selectively connecting the first rotation element with the fifth rotation element, a second clutch selectively connecting two rotation elements among the rotation elements of the first planetary gear set, a first brake interposed between the fifth rotation element and a transmission housing, and a second brake interposed between the fourth rotation element and the transmission housing.

5 Claims, 9 Drawing Sheets

FIG. 2

| Mode | | Cl1 | Cl2 | Bk1 | Bk2 |
|---|---|---|---|---|---|
| Ev | | | | On | |
| Torque Split Mode | Input Split | | | On | |
| | Compound Split | On | | | |
| Fixed Shift -speed Mode | Ud1 | | On | On | |
| | Ud2 | On | | On | |
| | 1:1 | On | On | | |
| | Od | On | | | On |

POWER TRANSMISSION SYSTEM OF HYBRID ELECTRIC VEHICLE

CROSS-REFERENCE TO RELATED APPLICATION

The present application claims priority of Korean Patent Application Number 10-2011-0055689 filed in the Korean Intellectual Property Office on Jun. 9, 2011, the entire contents of which application is incorporated herein for all purposes by this reference.

BACKGROUND OF INVENTION

1. Field of Invention

The present invention relates to a power transmission system of a hybrid electric vehicle. More particularly, the present invention relates to a power transmission system of a hybrid electric vehicle which realizes at least two torque split modes and at least four fixed shift-speed modes.

2. Description of Related Art

Generally, a hybrid electric vehicle is a vehicle driven by at least two different types of power sources.

Such a hybrid electric vehicle typically includes an engine and a motor/generator. The hybrid electric vehicle uses a motor/generator having relatively better low-speed torque characteristics as a main power source at a low-speed and uses an engine having relatively better high-speed torque characteristics as a main power source at a high-speed.

Since the hybrid electric vehicle stops an operation of an engine using fossil fuel and uses a motor/generator at a low-speed region, fuel consumption may be improved and exhaust gas may be reduced.

The power transmission system of a hybrid electric vehicle is classified into a mono-mode type and a multi-mode type.

A torque delivery apparatus such as clutches and brakes for shift control is not necessary, but fuel consumption is high due to deterioration of efficiency at a high-speed region and an additional torque multiplication device is required for being applied to a large vehicle according to the mono-mode type.

Since the multi-mode type has high efficiency and is able to multiply torque autonomously, the multi-mode type can be applied to a full size vehicle.

Therefore, the multi-mode type instead of the mono-mode type is applied as the power transmission system of a hybrid electric vehicle and is also under continuous investigation.

The power transmission system of the multi-mode type includes a plurality of planetary gear sets, a plurality of motor/generators operated as a motor and/or a generator, a plurality of torque delivery apparatus controlling rotation elements of the planetary gear set, and a battery used as a power source of the motor/generators.

The power transmission system of the multi-mode type has different operating mechanisms depend on connections of the planetary gear sets, the motor/generators, and the torque delivery apparatus.

In addition, the power transmission system of the multi-mode type has different features such as durability, power delivery efficiency, and size depending on the connections of the planetary gear sets, the motor/generators, and the torque delivery apparatus. Therefore, designs for the connection structure of the power transmission system of a hybrid electric vehicle are also under continuous investigation.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention are directed to provide a power transmission system of a hybrid electric vehicle having advantages of realizing one Electric Vehicle (EV) mode, at least two torque split modes including an input split mode and a compound split mode, and at least four fixed shift-speed modes by using at least one of torque delivery apparatus.

An exemplary power transmission system of a hybrid electric vehicle according to the present invention may include: an input shaft adapted to receive torque of an engine; a first planetary gear set having first, second, and third rotation elements, wherein the first rotation element is directly connected to a first motor/generator and the third rotation element is connected to the input shaft; a second planetary gear set having fourth, fifth, and sixth rotation elements, wherein the fourth rotation element is directly connected to the second rotation element and a second motor/generator, and the fifth rotation element is selectively connected to the first rotation element; an output gear connected to the sixth rotation element of the second planetary gear set; a first clutch adapted to selectively connect the first rotation element of the first planetary gear set with the fifth rotation element of the second planetary gear set; a second clutch adapted to selectively connect two rotation elements among the rotation elements of the first planetary gear set; a first brake interposed between the fifth rotation element of the second planetary gear set and a transmission housing; and a second brake interposed between the fourth rotation element of the second planetary gear set connected to the second motor/generator and the transmission housing.

The first planetary gear set may be a double pinion planetary gear set having a first sun gear, a first planet carrier, and a first ring gear as rotation elements thereof, wherein the first sun gear is selectively connected to the first ring gear through the second clutch and is selectively connected to the fifth rotation element of the second planetary gear set, the first planet carrier is connected to the second motor/generator, is selectively connected to the transmission housing through the second brake, and is directly connected to the fourth rotation element of the second planetary gear set, and the first ring gear is directly connected to the input shaft.

The second planetary gear set may be a double pinion planetary gear set having a second sun gear, a second planet carrier, and a second ring gear as rotation elements thereof, wherein the second sun gear is directly connected to the first planet carrier of the first planetary gear set, is connected to the second motor/generator, and is connected to the transmission housing through the second brake, the second planet carrier is selectively connected to the first sun gear of the first planetary gear set through the first clutch and is selectively connected to the transmission housing through the first brake, and the second ring gear is connected to the output gear.

Another exemplary power transmission system of a hybrid electric vehicle according to the present invention may include: a first planetary gear set having a first sun gear, a first planet carrier, and a first ring gear as rotation elements thereof; a second planetary gear set having a second sun gear, a second planet carrier, and a second ring gear as rotation elements thereof; first and second motor/generators adapted to be operated as a motor or a generator; a torque delivery apparatus including first and second clutches and first and second brakes, wherein the first sun gear is selectively connected to the second planet carrier and is connected to the first motor/generator, the first planet carrier is directly connected to the second sun gear, is connected to the second motor/generator, and is selectively connected to a transmission housing through the second brake, the first ring gear is directly connected to an input shaft and is selectively connected to the first sun gear through the second clutch, the second planet carrier is selectively connected to the transmission housing through the first brake, and the second ring gear is connected to an output gear.

The first planetary gear set and the second planetary gear set may be double pinion planetary gear sets.

The first brake may be operated at an EV mode, the first brake may be operated at an input split mode, the first clutch may be operated at a compound split mode, the second clutch and the first brake may be operated at a fixed first speed mode, the first clutch and the first brake may be operated at a fixed second speed mode, the first clutch and the second clutch may be operated at a fixed third speed mode, or the first clutch and the second brake may be operated at a fixed fourth speed mode.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of an exemplary torque delivery apparatus at each operation mode applied to an exemplary power transmission system according to the present invention.

DETAILED DESCRIPTION

Figure 1:
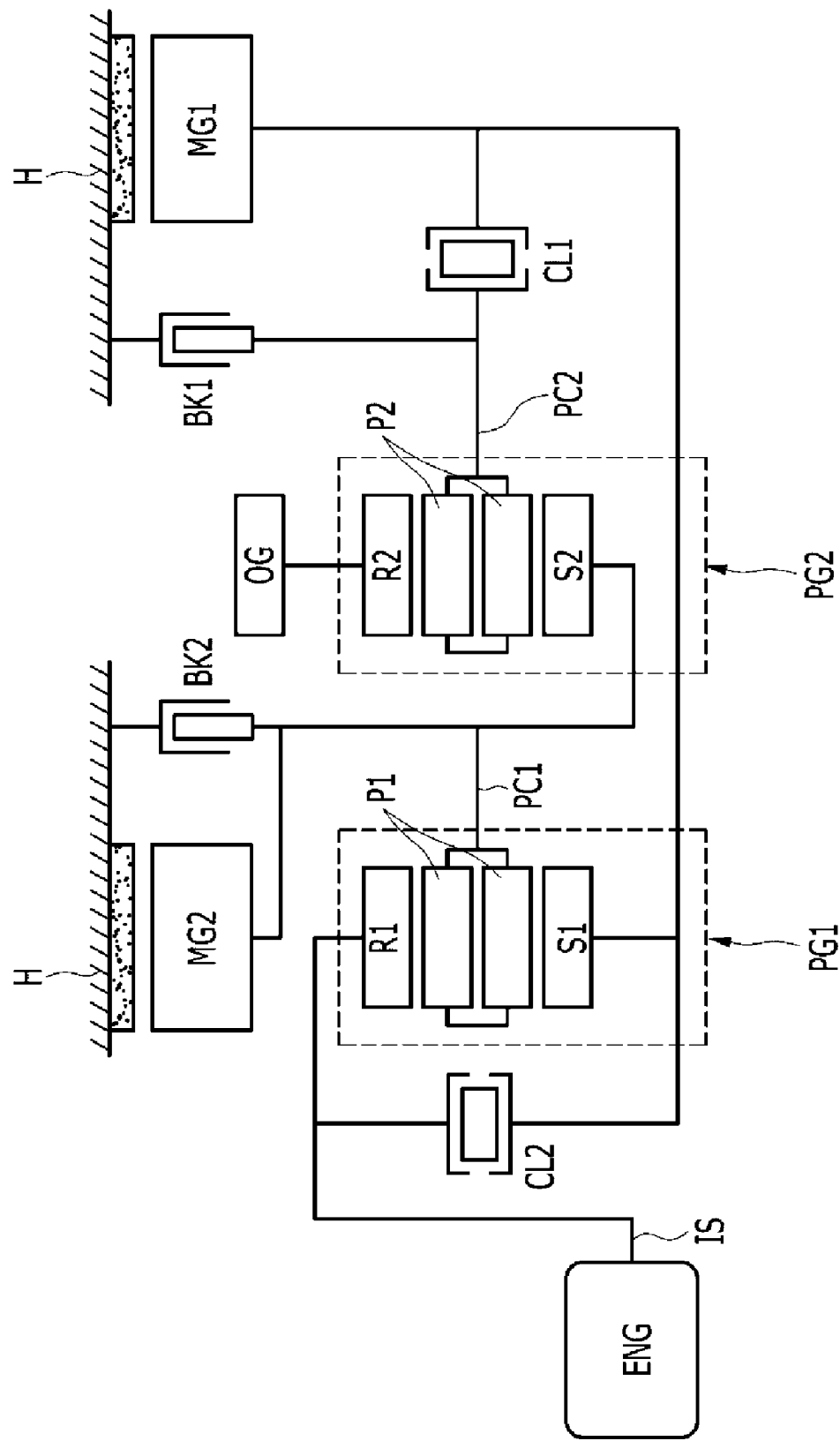
FIG. 1 is a schematic diagram of an exemplary power transmission system according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, various embodiments of the present invention will be described in detail with reference to the accompanying drawings.

Description of components that are not necessary for explaining the various embodiments will be omitted, and the same constituent elements are denoted by the same reference numerals in this specification.

In the detailed description, ordinal numbers are used for distinguishing constituent elements having the same terms, and have no specific meanings.

Referring to FIG. 1, a power transmission system of a hybrid electric vehicle according to various embodiments of the present invention receives torque of an engine ENG that is a power source through an input shaft IS, changes the torque according to a running state of a vehicle, and outputs the changed torque through an output gear OG.

The power transmission system includes first and second planetary gear sets PG1 and PG2, first and second motor/generators MG1 and MG2, and a torque delivery apparatus comprising of first and second clutches CL1 and CL2 and first and second brakes BK1 and BK2.

A rotation element of the first planetary gear set PG1 is directly connected to a rotation element of the second planetary gear set PG2, and another rotation element of the first planetary gear set PG1 is selectively connected to another rotation element of the second planetary gear set PG2 such that the first planetary gear set PG1 and the second planetary gear set PG2 operate as one compound planetary gear set.

The first motor/generator MG1 and the second motor/generator MG2 are independent power sources, and are operates as a motor and a generator in an otherwise conventional manner.

The first motor/generator MG1 is operated as a motor supplying torque to another rotation element of the first planetary gear set PG1 selectively connected to another rotation element of the second planetary gear set PG2, or is operated as a generator generating electricity when rotated by torque of another rotation element.

The second motor/generator MG2 is operated as a motor supplying torque to the rotation element of the first planetary gear set PG1 directly connected to the rotation element of the second planetary gear set PG2, or is operated as a generator generating electricity when rotated by torque of the rotation element.

For this purpose, the first motor/generator MG1 and the second motor/generator MG2 have stators fixed to a transmission housing H and rotors connected to another rotation element of the second planetary gear set PG2 and the rotation element of the first planetary gear set PG1, respectively.

The first clutch CL1 selectively connects another rotation element of the first planetary gear set PG1 with another rotation element of the second planetary gear set PG2, and the second clutch CL2 selectively connects two rotation elements among three rotation elements of the first planetary gear set PG1.

The first brake BK1 selectively connects another rotation element of the second planetary gear set PG2 with the transmission housing H such that another rotation element operates as a selective fixed element.

The second brake BK2 is disposed in parallel with the second motor/generator MG2 and makes the rotation element of the first planetary gear set PG1 connected to the second motor/generator MG2 operate as a selective fixed element.

The first and second planetary gear sets PG1 and PG2 and the first and second motor/generators MG1 and MG2 are disposed on the same axis.

The torque delivery apparatus comprises the first and second clutches CL1 and CL2 and the first and second brakes BK1 and BK2, which are conventional multi-plate friction elements of wet type that are operated by hydraulic pressure. One will appreciate that other types of clutches and brakes can be used, such as friction elements of dry type.

Herein, a clutch is a friction member which connects a rotation member with another rotation member, a brake is a friction member which connects a rotation member with a non-rotation member.

Constituent elements of a power transmission system according to various embodiments of the present invention will be described in detail.

The first planetary gear set PG1 is a double pinion planetary gear set, and includes three rotation elements consisting of a first sun gear S1, a first planet carrier PC1, and a first ring gear R1.

The first planet carrier PC1 rotatably supports a first pinion P1 engaged with the first sun gear S1 and the first ring gear R1.

The second planetary gear set PG2 is a double pinion planetary gear set, and includes three rotation elements consisting of a second sun gear S2, a second planet carrier PC2, and a second ring gear R2.

The second planet carrier PC2 rotatably supports a second pinion P2 engaged with the second sun gear S2 and the second ring gear R2.

The first planet carrier PC1 is directly connected to the second sun gear S2, and the first sun gear S1 is selectively connected to the second planet carrier PC2.

In addition, the first ring gear R1 is directly connected to the input shaft IS that is an input member, and the second ring gear R2 is directly connected to the output gear OG that is an output member.

The first motor/generator MG1 is directly connected to the first sun gear S1 of the first planetary gear set PG1 and is selectively connected to the second planet carrier PC2 of the second planetary gear set PG2 so as to drive the first sun gear S1 and the second planet carrier PC2 simultaneously or to drive the first sun gear S1 only. In addition, the first motor/generator MG1 may operate as a generator.

The second motor/generator MG2 is directly connected to the first planet carrier PC1 of the first planetary gear set PG1 and the second sun gear S2 of the second planetary gear set PG2 so as to drive the first planet carrier PC1 and the second sun gear S2 simultaneously. In addition, the second motor/generator MG2 may operate as a generator.

The first clutch CL1 is disposed between the first sun gear S1 of the first planetary gear set PG1 and the second planet carrier PC2 of the second planetary gear set PG2 and selectively connects the first sun gear S1 with the second planet carrier PC2.

The second clutch CL2 is disposed between the first sun gear S1 and the first ring gear R1 of the first planetary gear set PG1 so as to lock the first planetary gear set PG1. At this case, the first planetary gear set PG1 rotates as one rotation member.

The first brake BK1 is disposed between the second planet carrier PC2 of the second planetary gear set PG2 and the transmission housing H so as to operate the second planet carrier PC2 as a selective fixed element.

The second brake BK2 is disposed in parallel with the second motor/generator MG2, and operates the first planet carrier PC1 of the first planetary gear set PG1 and the second sun gear S2 of the second planetary gear set PG2 as a selective fixed element.

FIG. 2 is an operational chart of torque delivery apparatus at each operation mode applied to a power transmission system according to various embodiments of the present invention.

Referring to FIG. 2, torque delivery apparatus operated at each shift-speed will be described detail.

The first brake BK1 is operated at an EV mode. The first brake BK1 is operated at an input split mode. The first clutch CL1 is operated at a compound split mode. The second clutch CL2 and the first brake B1 are operated at a fixed first speed mode. The first clutch CL1 and the first brake BK1 are operated at a fixed second speed mode. The first clutch CL1 and the second clutch CL2 are operated at a fixed third speed mode. The first clutch CL1 and the second brake BK2 are operated at a fixed fourth speed mode.

As described above, the power transmission system according to various embodiments of the present invention can realize one EV mode, two torque split modes, and four fixed shift-speed modes.

Figure 3:
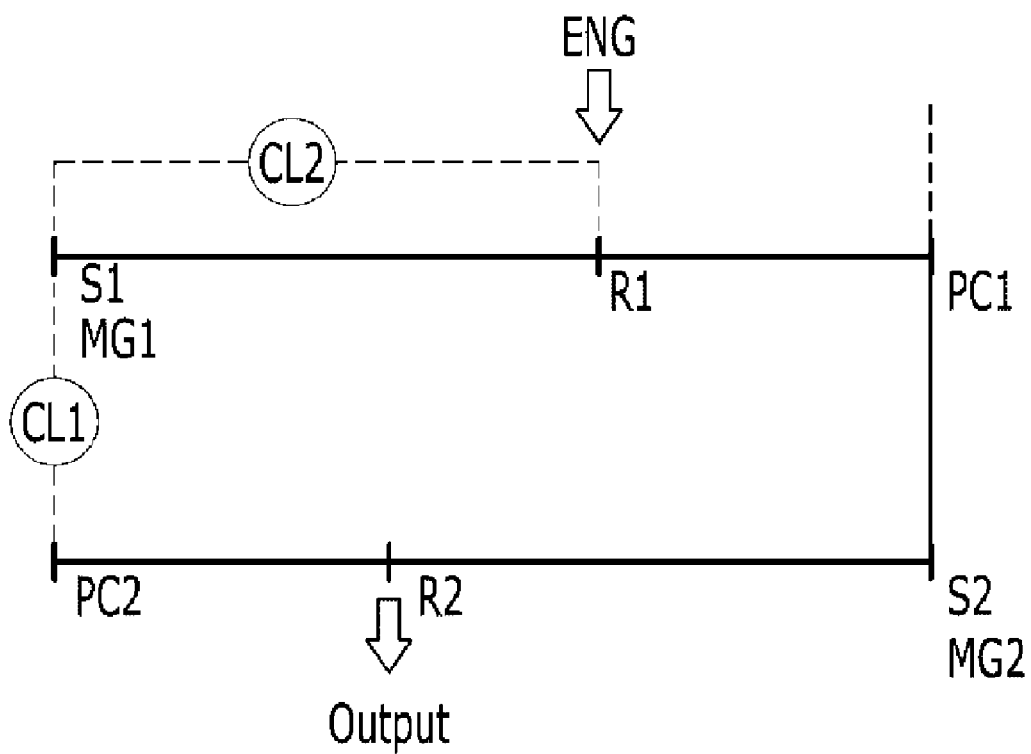
FIG. 3 is a schematic diagram showing connections between constituent elements of an exemplary power transmission system according to the present invention.
Figure 4:
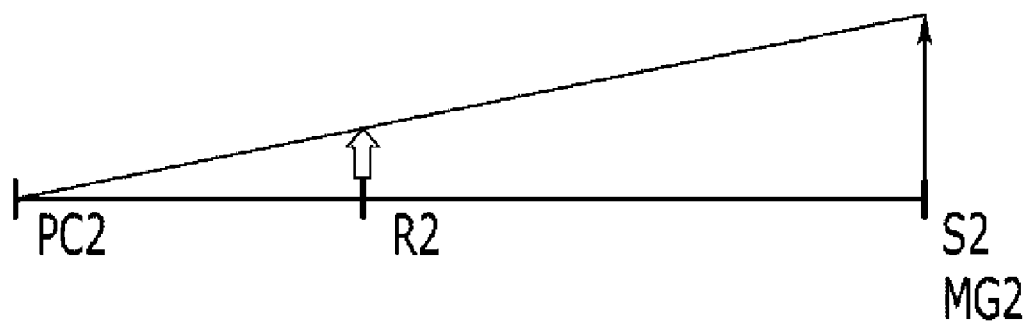
FIG. 4 is a lever diagram for an exemplary power transmission system according to the present invention at an Electric Vehicle (EV) mode and an input split mode.

FIG. 3 is a schematic diagram for showing connections between constituent elements of the power transmission system according to various embodiments of the present invention, and FIG. 4 is a lever diagram for a power transmission system according to various embodiments of the present invention at an EV mode and an input split mode.

Referring to FIG. 3 and FIG. 4, the first brake BK1 is operated at the EV mode.

The engine ENG maintains to be stopped, the first planetary gear set PG1 does not affect on the shifting, and the shifting is done by three rotation elements of the second planetary gear set PG2 at the EV mode.

That is, in a state that the second motor/generator MG2 operates so as to input torque thereof to the second sun gear S2, the second planet carrier PC2 is operated as a fixed element by operation of the first brake BK1 and a reduced speed is output through the second ring gear R2 that is the output element.

In addition, in a state that torque of the second sun gear S2 is input to the first planet carrier PC1, the engine ENG is stopped. Therefore, the first ring gear R1 is operated as a fixed element and the first motor/generator MG1 connected to the first sun gear S1 rotates inversely.

At this time, if the engine is started by control of the first motor/generator MG1, the input split mode is achieved.

Figure 5:
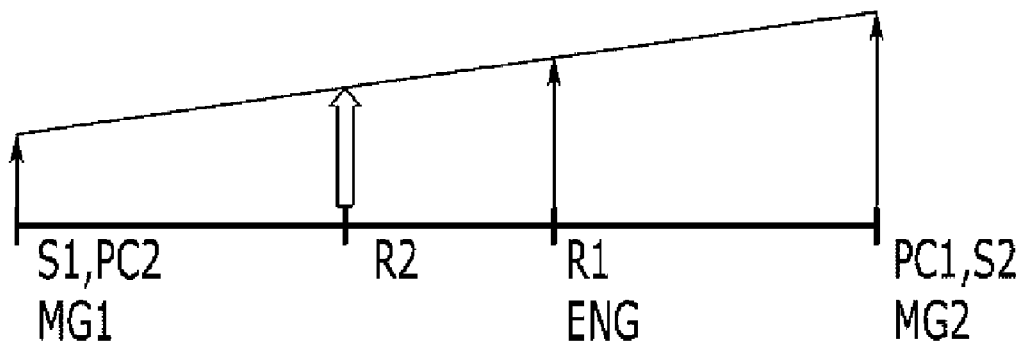
FIG. 5 is a lever diagram for an exemplary power transmission system according to the present invention at a compound split mode.

FIG. 5 is a lever diagram for a power transmission system according to various embodiments of the present invention at a compound split mode.

Referring to FIG. 3 and FIG. 5, the first and second planetary gear sets PG1 and PG2 are operated by four rotation elements because the first clutch CL1 operates at the compound split mode. At this state, the first motor/generator MG1 and the second motor/generator MG2 are connected to the engine ENG or the output gear OG through the rotation elements of the planetary gear sets.

Therefore, the engine ENG, the first motor/generator MG1, and the second motor/generator MG2 can generate driving torque, one of them supplies torque to another of them so as to generate electricity, and all the speed ratios required for driving the vehicle can be obtained by changing their speeds suitably.

Figure 6:
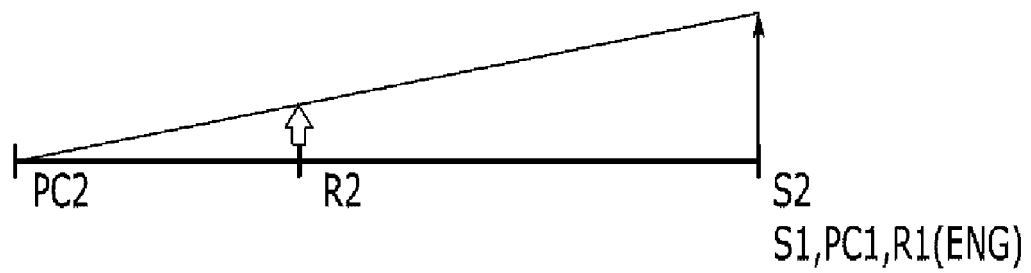
FIG. 6 is a lever diagram for an exemplary power transmission system according to the present invention at a fixed first speed mode.

FIG. 6 is a lever diagram for a power transmission system according to various embodiments of the present invention at a fixed first speed mode.

Referring to FIG. 3 and FIG. 6, the second clutch CL2 and the first brake BK1 are operated at the fixed first speed mode.

Since the first planetary gear set PG1 becomes direct-coupling state by operation of the second clutch CL2, three rotation elements of the second planetary gear set PG2 are related to the shifting.

At this state, torque of the engine ENG is input to the second sun gear S2 of the second planetary gear set PG2 through the first planet carrier PC1 of the first planetary gear set PG1, and the second planet carrier PC2 is operated as a fixed element by operation of the first brake B1. Therefore, a reduced speed by a predetermined speed ratio is output and the fixed first speed mode is achieved.

Figure 7:
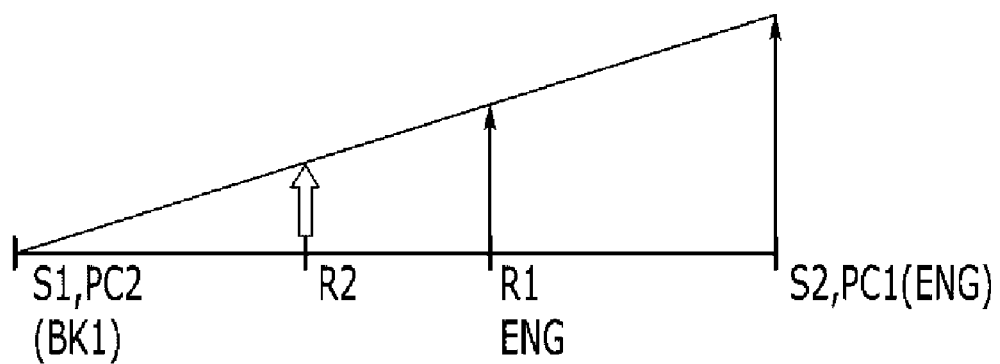
FIG. 7 is a lever diagram for an exemplary power transmission system according to the present invention at a fixed second speed mode.

FIG. 7 is a lever diagram for a power transmission system according to various embodiments of the present invention at a fixed second speed mode.

Referring to FIG. 3 and FIG. 7, the first clutch CL1 and the first brake BK1 are operated at the fixed second speed mode.

Then, the first and second planetary gear sets PG1 and PG2 are operated by four rotation elements by operation of the first clutch CL1.

At this state, torque of the engine ENG is input to the second sun gear S2 of the second planetary gear set PG2 through the first planetary gear set PG1, and the first sun gear S1 and the second planet carrier PC2 are operated as fixed elements by operation of the first brake B1. Therefore, a reduced speed by a predetermined speed ratio is output and the fixed second speed mode is achieved.

Figure 8:
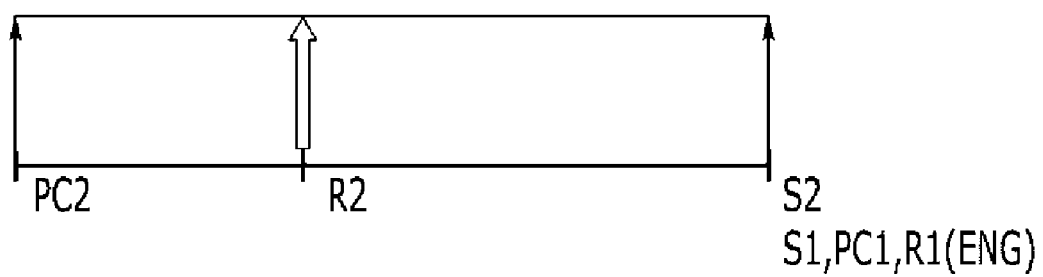
FIG. 8 is a lever diagram for an exemplary power transmission system according to the present invention at a fixed third speed mode.

FIG. 8 is a lever diagram for a power transmission system according to various embodiments of the present invention at a fixed third speed mode.

Referring to FIG. 3 and FIG. 8, the first brake BK1 that was operated at the fixed second speed mode is released and the second clutch CL2 is operated at the fixed third speed mode.

Since the first planetary gear set PG1 becomes direct-coupling state by operation of the second clutch CL2, three rotation elements of the second planetary gear set PG2 are related to the shifting.

At this state, torque of the engine ENG is input to the second sun gear S2 and the second planet carrier PC2 of the second planetary gear set PG2 through the first planetary gear set PG1.

Therefore, the second planetary gear set PG2 becomes direct-coupling state and a rotation speed that is the same as a rotation speed of the engine is output and the fixed third speed mode is achieved.

Figure 9:
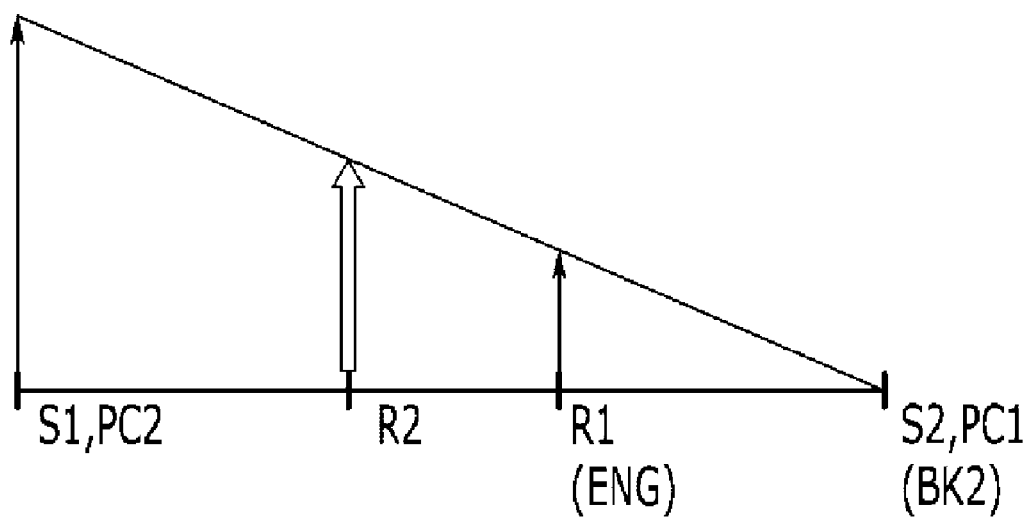
FIG. 9 is a lever diagram for an exemplary power transmission system according to the present invention at a fixed fourth speed mode.

FIG. 9 is a lever diagram for a power transmission system according to various embodiments of the present invention at a fixed fourth speed mode.

Referring to FIG. 3 and FIG. 9, the second clutch CL2 that was operated at the fixed third speed mode is released and the second brake BK2 is operated at the fixed fourth speed mode.

Then, the first sun gear S1 and the second planet carrier PC2 are connected by operation of the first clutch CL1 and the first planetary gear set PG1 and the second planetary gear set PG2 are operated by four rotation elements.

At this state, torque of the engine ENG is input to the first ring gear R1, and the first planet carrier PC1 and the second sun gear S2 are operated as fixed elements by operation of the second brake BK2. Therefore, an increased speed by a predetermined speed ratio is output. That is, overdrive mode with a fixed speed ratio is achieved.

Various embodiments of the present invention achieve one EV mode, two torque split modes consisting of an input split mode and a compound split mode, and four fixed shift-speed modes.

Accordingly, various embodiments of the present invention achieve multi-mode type where fixed speed ratios and variable speed ratios are combined. Therefore, high efficiency may be achieved at all the speed ratios of a vehicle and fuel economy may be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power transmission system of a hybrid electric vehicle, comprising:
    an input shaft adapted to receive a torque of an engine;
    a first planetary gear set having first, second, and third rotation elements, wherein the first rotation element is directly connected to a first motor/generator and the third rotation element is connected to the input shaft;
    a second planetary gear set having fourth, fifth, and sixth rotation elements, wherein the fourth rotation element is directly connected to the second rotation element and a second motor/generator, and the fifth rotation element is selectively connected to the first rotation element,
    an output gear connected to the sixth rotation element of the second planetary gear set;
    a first clutch adapted to selectively connect the first rotation element of the first planetary gear set with the fifth rotation element of the second planetary gear set;
    a second clutch adapted to selectively connect two rotation elements among the rotation elements of the first planetary gear set;
    a first brake interposed between the fifth rotation element of the second planetary gear set and a transmission housing; and
    a second brake interposed between the fourth rotation element of the second planetary gear set connected to the second motor/generator and the transmission housing,
    wherein the first planetary gear set is a double pinion planetary gear set having a first sun gear, a first planet carrier, and a first ring gear as rotation elements thereof,
    wherein the first sun gear is selectively connected to the first ring gear through the second clutch and is selectively connected to the fifth rotation element of the second planetary gear set through the first clutch,
    the first planet carrier is connected to the second motor/generator, is selectively connected to the transmission housing through the second brake, and is directly connected to the fourth rotation element of the second planetary gear set, and
    the first ring gear is directly connected to the input shaft.

2. The power transmission system of claim 1, wherein the second planetary gear set is a double pinion planetary gear set having a second sun gear, a second planet carrier, and a second ring gear as rotation elements thereof, wherein the second sun gear is directly connected to the first planet carrier of the first planetary gear set, is connected to the second motor/generator, and is connected to the transmission housing through the second brake, the second planet carrier is selectively connected to the first sun gear of the first planetary gear set through the first clutch and is selectively connected to the transmission housing through the first brake, and the second ring gear is connected to the output gear.

3. A power transmission system of a hybrid electric vehicle, comprising:

a first planetary gear set having a first sun gear, a first planet carrier, and a first ring gear as rotation elements thereof;

a second planetary gear set having a second sun gear, a second planet carrier, and a second ring gear as rotation elements thereof;

first and second motor/generators adapted to be operated as a motor or a generator;

a torque delivery apparatus including first and second clutches and first and second brakes, wherein the first sun gear is selectively connected to the second planet carrier and is connected to the first motor/generator, the first planet carrier is directly connected to the second sun gear, is connected to the second motor/generator, and is selectively connected to a transmission housing through the second brake, the first ring gear is directly connected to an input shaft and is selectively connected to the first sun gear through the second clutch, the second planet carrier is selectively connected to the transmission housing through the first brake, and the second ring gear is connected to an output gear.

4. The power transmission system of claim 3, wherein the first planetary gear set and the second planetary gear set are double pinion planetary gear sets.

5. The power transmission system of claim 3, wherein the first brake is operated at an Electric Vehicle (EV) mode, the first brake is operated at an input split mode, the first clutch is operated at a compound split mode, the second clutch and the first brake are operated at a fixed first speed mode, the first clutch and the first brake are operated at a fixed second speed mode, the first clutch and the second clutch are operated at a fixed third speed mode, or the first clutch and the second brake are operated at a fixed fourth speed mode.

* * * * *

UNITED STATES PATENT AND TRADEMARK OFFICE
CERTIFICATE OF CORRECTION

PATENT NO. : 8,303,447 B1
APPLICATION NO. : 13/303698
DATED : November 6, 2012
INVENTOR(S) : Baekyu Kim et al.

Page 1 of 1

It is certified that error appears in the above-identified patent and that said Letters Patent is hereby corrected as shown below:

Title page

Add:

item -- (30) Foreign Application Priority Data

June 9, 2011   (KR) ...................... 10-2011-0055689 --

Signed and Sealed this
Nineteenth Day of March, 2013

Teresa Stanek Rea
*Acting Director of the United States Patent and Trademark Office*